United States Patent
Wei et al.

(10) Patent No.: US 12,270,757 B1
(45) Date of Patent: Apr. 8, 2025

(54) METHOD FOR DETERMINING DYNAMIC ADSORPTION RETENTION OF POLYMER CAPSULES

(71) Applicant: CHINA UNIVERSITY OF PETROLEUM (EAST CHINA), Qingdao (CN)

(72) Inventors: Bei Wei, Qingdao (CN); Yongsheng Liu, Qingdao (CN); Jian Hou, Qingdao (CN); Jiahe Sun, Qingdao (CN); Kang Zhou, Qingdao (CN); Yu Xue, Qingdao (CN); Ningyu Zheng, Qingdao (CN); Qingjun Du, Qingdao (CN); Xuwen Qin, Qingdao (CN); Yongge Liu, Qingdao (CN)

(73) Assignee: CHINA UNIVERSITY OF PETROLEUM (EAST CHINA), Qingdao (CN)

(*) Notice: Subject to any disclaimer, the term of this patent is extended or adjusted under 35 U.S.C. 154(b) by 0 days.

(21) Appl. No.: 18/942,721

(22) Filed: Nov. 10, 2024

(51) Int. Cl.
*G01N 21/33* (2006.01)

(52) U.S. Cl.
CPC .................. *G01N 21/33* (2013.01)

(58) Field of Classification Search
CPC ...................................................... G01N 21/33
See application file for complete search history.

(56) References Cited

FOREIGN PATENT DOCUMENTS

| | | |
|---|---|---|
| CN | 110382438 A | 10/2019 |
| WO | 2018165256 A1 | 9/2018 |

OTHER PUBLICATIONS

Liu, Yongsheng, et al. "Visualization Experimental Study on In-Situ Triggered Displacement Mechanism by Microencapsulated Polymer in Porous Media." SPE Journal (Jun. 4, 2024): 1-14.*

Liu, Yongsheng, et al. "Laboratory studies of the feasibility for microencapsulated polymer flooding." Fuel 354 (Aug. 4, 2023): 129378.*

Jian, H. O. U., et al. "Capsule polymer flooding for enhanced oil recovery." Petroleum Exploration and Development 51.5 (Oct. 18, 2024): 1261-1270.*

(Continued)

*Primary Examiner* — Robert J Eom
(74) *Attorney, Agent, or Firm* — CBM PATENT CONSULTING, LLC

(57) ABSTRACT

Disclosed is a method for determining the dynamic adsorption retention of polymer capsules, belonging to the technical field of oil and gas field development engineering, which includes: (1) carrying out a thermal aging experiment to establish relational expressions between a capsule concentration and an aging time, as well as a polymer release concentration and the aging time; (2) setting up a polymer capsule displacement experimental device to determine the release concentration of polymers in effluent; (3) releasing polymers encapsulated by capsules in the effluent to acquire a total adsorption retention of polymers in a porous medium; and (4) inverting respective adsorption retentions of the capsule particles and the polymers in the porous medium.

9 Claims, 3 Drawing Sheets

(56) References Cited

OTHER PUBLICATIONS

El-Hoshoudy, A. N. "Synthesis of acryloylated starch-g-poly acrylates crosslinked polymer functionalized by emulsified vinyltrimethylsilane derivative as a novel EOR agent for severe polymer flooding strategy." International journal of biological macromolecules 123 (Nov. 14, 2018): 124-132.*

Zhang Wenling; Zhong Hong; Wang Weihong; Study on preparation of polythiourea sustained-release microcapsules by interfacial polymerization; Chemical Engineering Journal, Issue 06; 1-9 Publication date: Jun. 25, 2007.

* cited by examiner

```
┌─────────────────────────────────────────────────────────┐
│ Carry out a thermal aging experiment to establish       │
│ relational expressions between a capsule concentration  │
│ and an aging time, as well as a polymer release         │
│ concentration and the aging time                        │
└─────────────────────────────────────────────────────────┘
                            │
                            ▼
┌─────────────────────────────────────────────────────────┐
│ Set up a polymer capsule displacement experimental      │
│ device to determine the release concentration of        │
│ polymers in effluent                                    │
└─────────────────────────────────────────────────────────┘
                            │
                            ▼
┌─────────────────────────────────────────────────────────┐
│ Release polymers encapsulated by capsules to acquire a  │
│ total adsorption retention of polymers in a porous      │
│ medium                                                  │
└─────────────────────────────────────────────────────────┘
                            │
                            ▼
┌─────────────────────────────────────────────────────────┐
│ Invert respective adsorption retentions of capsule      │
│ particles and polymers in the porous medium             │
└─────────────────────────────────────────────────────────┘
```

Fig. 1

METHOD FOR DETERMINING DYNAMIC ADSORPTION RETENTION OF POLYMER CAPSULES

CROSS-REFERENCE TO RELATED APPLICATIONS

This application claims priority to Chinese Patent Application Ser. No. CN2024110082196 filed on 26 Jul. 2024.

FIELD OF THE INVENTION

The present disclosure relates to the technical field of oil and gas field development engineering, and particularly to a method for determining the dynamic adsorption retention of polymer capsules.

BACKGROUND OF THE INVENTION

Polymer flooding is an important measure to enhance oil recovery in oil fields. The addition of polymers can increase the viscosity of the water phase and reduce the water-oil mobility ratio, thereby expanding the sweep and improving microscopic displacement efficiency. However, due to the high viscosity of polymers, there are challenges during implementation, such as injection difficulties and large viscosity shear loss. To achieve deep profile control, it is necessary to inject high concentrations or high doses of polymer solutions, which poses significant economic challenges under the goal of reducing costs and increasing efficiency in oil fields. Polymers are encapsulated to synthesize thermal response polymer capsules, which have the advantages of shell encapsulation to resist shear degradation and sustained-release viscosity enhancement to facilitate the deep profile control.

In the related art of polymer flooding, the adsorption retention of polymer macromolecules in porous media is a crucial factor that must be considered during its popularization and application. Excessive adsorption retention may lead to the premature loss of effectiveness of polymer flooding. Currently, a common method to study the dynamic adsorption of polymers includes injecting a polymer solution into the core and calculating the difference between the injection concentration and the outflow concentration of the polymer solution to obtain the adsorption retention. However, polymer capsules require several days or even tens of days to release the polymers in reservoir conditions, which involves a complex seepage and adsorption process. How to characterize the mechanical trapping of capsule particles in porous media, the interaction between polymer macromolecules and capsule particles, and the adsorption form of polymer macromolecules on the surfaces of porous media are problems that need to be solved urgently in the process of application and popularization of polymer capsules in oil fields.

However, the current measurement methods are still unable to effectively determine the polymer adsorption loss in porous media after polymer encapsulation. Therefore, it is necessary to propose a new test method, which can more truly reflect the dynamic adsorption characteristics of polymer capsules in porous media and accurately determine the adsorption retention of polymers.

SUMMARY OF THE INVENTION

In view of the deficiencies of the related art, the present disclosure provides a method for determining the dynamic adsorption retention of polymer capsules.

TERM EXPLANATION

1. Thermal aging experiment: a polymer capsule reagent is placed in an ampoule bottle for deoxidizing and sealing, and the ampoule bottle is placed in an oven at a certain set temperature for static aging.
2. Reservoir temperature is the temperature corresponding to the oil reservoir.

The present disclosure adopts the following technical solutions.

A method for determining the dynamic adsorption retention of polymer capsules is provided, comprising a non-transitory computer readable medium operable on a computer with memory for the method for determining the dynamic adsorption retention of polymer capsules, and comprising program instructions for executing the following steps of:

(1) carrying out a thermal aging experiment to establish relational expressions between a capsule concentration and an aging time, as well as a polymer release concentration and the aging time;
measuring the absorbance of different concentrations of polymer solutions, and drawing a standard curve between a polymer solution concentration and the absorbance; preparing a series of polymer capsule concentrations, and triggering and releasing encapsulated polymers to establish a relational expression between the capsule concentration and a complete release concentration of polymers; and establishing the relational expressions between the polymer release concentration and the aging time, as well as a concentration of unreleased polymers encapsulated by capsules and the aging time through the thermal aging experiment;

(2) setting up a polymer capsule displacement experimental device to determine the release concentration of polymers in effluent;
carrying out a polymer capsule displacement experiment, periodically acquiring the effluent, then diluting the effluent, filtering and removing capsule particles in a diluted solution, and determining an absorbance value of the solution to obtain the release concentration of polymers in the effluent based on the standard curve between the polymer solution concentration and the absorbance in step (1);

(3) releasing polymers encapsulated by capsules in the effluent to acquire a total adsorption retention of polymers in a porous medium;
performing a thermal aging experiment after diluting the effluent, including: sealing and placing the effluent at a reservoir temperature for complete triggering to release the encapsulated polymers; and determining the total polymer concentration of the effluent; and (4) inverting respective adsorption retentions of the capsule particles and the polymers in the porous medium;
calculating the concentration of polymers encapsulated by remaining capsule particles in the solution based on the polymer concentration before the effluent triggering in step (2) and the polymer concentration after the effluent triggering in step (3); and
inverting respective adsorption retentions of the capsule particles and polymer molecules in the porous medium according to the relational expressions between the polymer release concentration and the aging time, as well as the concentration of unreleased polymers encapsulated by capsules and the aging time, and the standard curve between the polymer solution concentration and the absorbance obtained in step (1).

Preferably, in step (1), an expression of the standard curve between the polymer solution concentration and the absorbance is shown in equation (I):

$$C_{polymer}=a \times A+b \quad (I),$$

where $C_{polymer}$ is an unencapsulated polymer solution concentration, A is the absorbance, and a and b are fitting constants.

Preferably, in step (1), the relational expression between the capsule concentration and the complete release concentration of polymers is shown in equation (II):

$$C_{capsule}=c \times C_{c-polymer} \quad (II),$$

where $C_{capsule}$ is the capsule concentration, $C_{c-polymer}$ is the complete release concentration of polymers in capsules, and c is a fitting constant.

Preferably, in step (1), at an aging t moment, the relational expressions between the polymer release concentration and the aging time, as well as the concentration of unreleased polymers encapsulated by capsules and the aging time are shown in equation (III):

$$C_{c-polymer}=C_{polymer,t}+C_{p-capsule,t} \quad (III),$$

where $C_{polymer,t}$ is the polymer release concentration in the solution at the aging t moment, and $C_{p-capsule,t}$ is the concentration of unreleased polymers encapsulated by capsules at the aging t moment.

Preferably, according to the present disclosure, in step (2), the polymer capsule displacement experimental device is set up to perform the polymer capsule displacement experiment; the polymer capsule displacement experimental device includes intermediate containers configured to contain different release levels of polymer capsule solutions and simulated formation water, a sand-filled pipe model for displacement, a heating device configured to simulate the reservoir environmental temperature, and an ultraviolet spectrophotometer configured to determine the absorbance of the polymer solution.

Further preferably, the polymer capsule displacement experimental device includes an injection pump, an injection pipeline, a first intermediate container configured to contain the different release levels of polymer capsule solutions, a second intermediate container configured to contain the simulated formation water, a first six-way valve, a second six-way valve, a first valve, a second valve, a third valve, a fourth valve, a fifth valve, the sand-filled pipe model for displacement, a heating oven configured to simulate the reservoir environmental temperature, the ultraviolet spectrophotometer configured to determine the absorbance of the polymer solution, a buffer bottle, a drying pipe, a vacuum pump, and a sample receiving tube.

The polymer capsule displacement experiment is performed to determine the release concentration of polymers in the effluent.

Preferably, in step (3), an expression of the total adsorption retention of polymers in the porous medium is shown in equation (IV):

$$A_r = \frac{C_{c-polymer}V_0 - \sum_{i=1}^{n}(C_{polymer,i,t}V_i)}{W}, \quad (IV)$$

where $A_r$ is the total adsorption retention of polymers in the porous medium, $V_0$ is the injection volume of polymer capsules, $V_i$ is the volume of an i-th effluent sample, $C_{polymer,i,t}$ is the concentration of completely triggered polymers in the i-th effluent sample acquired at an aging t moment, n is the total number of effluent samples, and W is the total dry weight of quartz sand.

Preferably, in step (4), an expression of the adsorption retention of polymer molecules in the porous medium is shown in equation (V):

$$A_{r,p} = \frac{C_{polymer,t}V_0 - \sum_{i=1}^{n}C_{p,i,t}V_i}{W}, \quad (V)$$

where $A_{r,p}$ is the adsorption retention of polymer molecules in the porous medium, and $C_{p,i,t}$ is the concentration of polymer molecules in an i-th effluent sample acquired at the aging t moment.

Preferably, an expression of the adsorption retention of capsule particles in the porous medium is shown in equation (VI):

$$A_{r,c} = \frac{c\left[C_{p-capsule,t}V_0 - \sum_{i=1}^{n}(C_{polymer,i,t} - C_{p,i,t})V_i\right]}{W}, \quad (VI)$$

where $A_{r,c}$ is the adsorption retention of capsule particles in the porous medium.

Beneficial effects of the present disclosure are as follows.
(1) The present disclosure effectively solves the problem that the total adsorption retention loss of polymers in the reservoir migration process of the polymer capsules cannot be quantitatively characterized.
(2) The method for determining the dynamic adsorption retention of polymer capsules provided by the present disclosure can accurately describe the level and detailed process of the adsorption retention of capsule particles, the interaction between polymers and capsule particles, and the adsorption and trapping of polymers on the surfaces of porous media under different injection speeds, permeability reservoirs, and different triggering stages of the polymer capsule solution, which is helpful to deeply understand the dynamic behaviors of polymer capsules in underground reservoirs, and provides important experimental support and theoretical basis for underground capsule polymer flooding.
(3) The determination method of the present disclosure has a simple operation and a low experimental cost.

BRIEF DESCRIPTION OF THE DRAWINGS

FIG. 1 is a flowchart of a method for determining the dynamic adsorption retention of polymer capsules according to the present disclosure;

Figure 2:
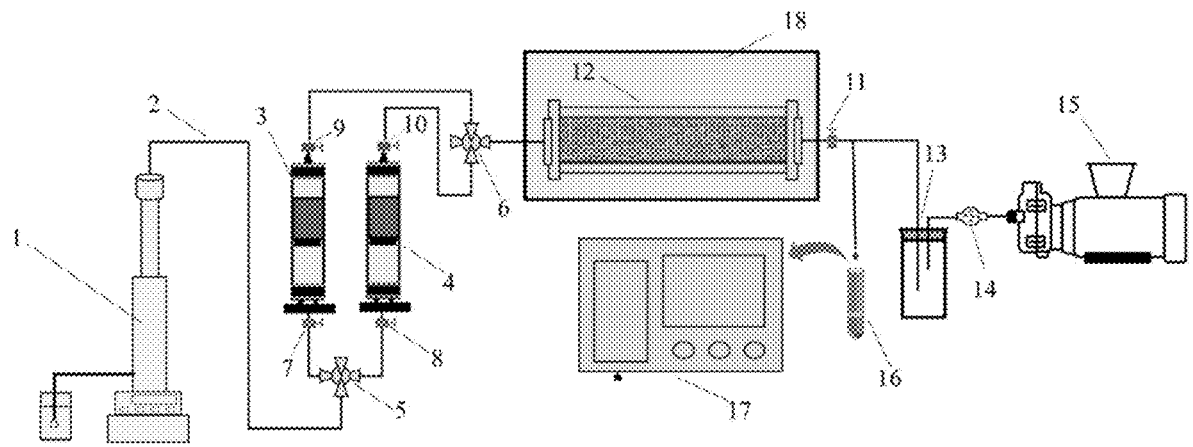
FIG. 2 is a schematic structural diagram of a polymer capsule displacement experimental device according to the present disclosure.

In the drawings, 1—injection pump, 2—injection pipeline, 3—first intermediate container, 4—second intermediate container, 5—first six-way valve, 6—second six-way valve, 7—first valve, 8—second valve, 9—third valve, 10—fourth valve, 11—fifth valve, 12—sand-filled pipe model, 13—buffer bottle, 14—drying pipe, 15—vacuum pump, 16—sample receiving tube, 17—ultraviolet spectrophotometer, and 18—heating oven.

DETAILED DESCRIPTION OF THE EMBODIMENTS

In order to enable a person skilled in the art to better understand the technical solutions in the present specification, the technical solutions in the embodiments of the present disclosure will be clearly and completely described below with reference to the accompanying drawings in the embodiments of the specification, but the present disclosure is not limited thereto, and all other embodiments obtained by a person skilled in the art without inventive effort fall within the scope of the present disclosure.

Example 1

A method for determining the dynamic adsorption retention of polymer capsules is provided, as shown in FIG. 1, comprising a non-transitory computer readable medium operable on a computer with memory for the method for determining the dynamic adsorption retention of polymer capsules, and comprising program instructions for executing the following steps of:

(1) A thermal aging experiment was carried out to establish relational expressions between capsule concentration and aging time, as well as polymer release concentration and aging time.

The absorbance of different concentrations of polymer solutions was measured, and a standard curve between a polymer solution concentration and the absorbance was drawn. A series of polymer capsule concentrations were prepared, and encapsulated polymers were triggered and released to establish a relational expression between the capsule concentration and a complete release concentration of polymers. The relational expressions between the polymer release concentration and the aging time, as well as a concentration of unreleased polymers encapsulated by capsules and the aging time were established through the thermal aging experiment.

(2) A polymer capsule displacement experimental device was set up to determine the release concentration of polymers in effluent.

A polymer capsule displacement experiment was carried out, the effluent was periodically acquired and then diluted, capsule particles in a diluted solution were filtered and removed, and an absorbance value of the solution was determined to obtain the release concentration of polymers in the effluent based on the standard curve between the polymer solution concentration and the absorbance in step (1).

(3) Polymers encapsulated by capsules in the effluent were released to acquire a total adsorption retention of polymers in a porous medium.

A thermal aging experiment was performed after diluting the effluent, including: sealing and placing the effluent at a reservoir temperature for complete triggering to release the encapsulated polymers; and determining the total polymer concentration of the effluent.

A thermal aging experiment was performed on diluted effluent, the encapsulated polymer molecules were completely released, and the absorbance of the solution was determined. Based on the standard curve between the polymer solution concentration and the absorbance obtained in step (1), the total polymer concentration of the effluent was inverted to obtain the total adsorption retention of polymers in the porous medium.

(4) Respective adsorption retentions of the capsule particles and the polymers in the porous medium were inverted.

The concentration of polymers encapsulated by remaining capsule particles in the solution was calculated based on the polymer concentration before the effluent triggering in step (2) and the polymer concentration after the effluent triggering in step (3). Before the polymer capsule effluent was triggered, the solution contained polymers and a part of the remaining capsule particles. After the triggering, the polymers encapsulated by the remaining capsule particles were also released. The concentration of polymers encapsulated by the remaining capsule particles in the solution was the polymer concentration after the triggering minus the polymer concentration before the triggering.

Respective adsorption retentions of the capsule particles and polymer molecules in the porous medium were inverted according to the relational expressions between the polymer release concentration and the aging time, as well as the concentration of unreleased polymers encapsulated by capsules and the aging time, and the standard curve between the polymer solution concentration and the absorbance obtained in step (1).

Example 2

Compared with the method for determining the dynamic adsorption retention of polymer capsules according to example 1, this example has the following differences.

In step (1), a thermal aging experimental device for carrying out a thermal aging experiment includes an ampoule bottle configured to contain a polymer capsule solution, a vacuum pump configured to vacuumize and deoxidize, an oscillator configured to oscillate the solution, a pressure-resistant vacuum pipe, a silica gel hose, and a drying bottle. The vacuum pump is sequentially connected to the drying bottle and the pressure-resistant vacuum pipe and configured to provide a vacuum environment. The pressure-resistant vacuum tube is installed with 5-10 external joints and connected to the ampoule bottle through the silica gel hose. The ampoule bottle is placed on the oscillator, and the effect of dissolved oxygen on the thermo-oxidative degradation of the polymers is solved by multi-frequency oscillation vacuumizing and deoxidizing. The dissolved oxygen content in the ampoule bottle is less than 10 ppb.

In step (1), an expression of the standard curve between the polymer solution concentration and the absorbance is shown in equation (I):

$$C_{polymer} = a \times A + b \quad \text{(I)},$$

where $C_{polymer}$ is an unencapsulated polymer solution concentration, A is the absorbance, and a and b are fitting constants.

In step (1), the relational expression between the capsule concentration and the complete release concentration of polymers is shown in equation (II):

$$C_{capsule} = c \times C_{c\text{-}polymer} \quad \text{(II)},$$

where $C_{capsule}$ is the capsule concentration, $C_{c\text{-}polymer}$ is the complete release concentration of polymers in capsules, and c is a fitting constant. The relational expression between the release concentration of polymers in capsules and the absorbance satisfies equation (I).

In step (1), at an aging t moment, the relational expressions between the polymer release concentration and the aging time, as well as the concentration of unreleased polymers encapsulated by capsules and the aging time are shown in equation (III):

$$C_{c\text{-}polymer} = C_{polymer,t} + C_{p\text{-}capsule,t} \quad \text{(III)},$$

where $C_{polymer,t}$ is the polymer release concentration in the solution at the aging t moment, and $C_{p\text{-}capsule,t}$ is the concentration of unreleased polymers encapsulated by capsules at the aging t moment.

Polymer solution concentration refers to unencapsulated polymers and is used for determining the relationship between the polymer concentration and the absorbance.

Absorbance refers to the absorbance of polymers at a specific absorption wavelength and is measured by an ultraviolet spectrophotometer, and also refers to a ratio of the incident light intensity before the light passes through the solution to the transmitted light intensity after the light passes through the solution.

Capsule concentration refers to the concentration of polymer capsules prepared during the experiment.

Complete release concentration of polymers refers to the concentration corresponding to the complete release of polymers encapsulated by the polymer capsules.

Polymer release concentration refers to the concentration of polymers released by the polymer capsules at a certain aging moment.

Concentration of unreleased polymers encapsulated by capsules refers to the concentration of polymers that have not been released at a certain aging moment.

Aging time refers to the time when the polymer capsules are placed in an oven for aging.

Figure 3:
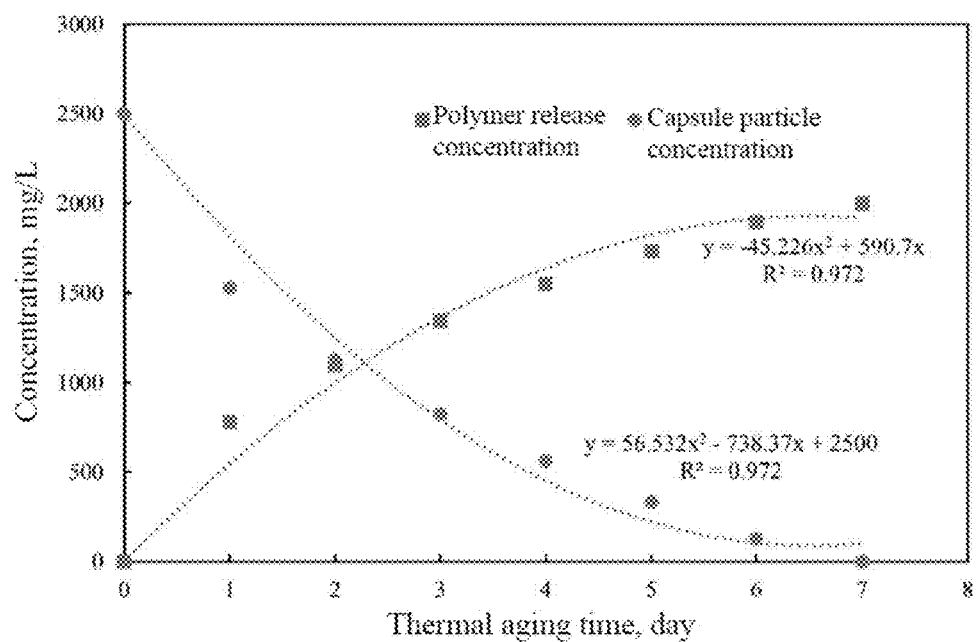
FIG. 3 is a schematic diagram showing the relationship curves between polymer release concentrations and capsule concentrations at different trigger times.

In this example, the values of constants a, b, and c are 0.0057, 0, and 0.8, respectively, and the polymer concentrations in equation (I) have a good linear relationship in the range of 0-100 mg/L. FIG. 3 shows the relationship curve between the polymer release concentration and the capsule concentration in the polymer capsule solution at different triggering times.

In step (2), the polymer capsule displacement experimental device is set up to perform the polymer capsule displacement experiment.

The polymer capsule displacement experimental device includes intermediate containers configured to contain different release levels of polymer capsule solutions and simulated formation water, a sand-filled pipe model for displacement, a heating device configured to simulate the reservoir environmental temperature, and an ultraviolet spectrophotometer configured to determine the absorbance of the polymer solution.

As shown in FIG. 2, the polymer capsule displacement experimental device includes an injection pump 1, an injection pipeline 2, a first intermediate container 3 configured to contain the different release levels of polymer capsule solutions, a second intermediate container 4 configured to contain the simulated formation water, a first six-way valve 5, a second six-way valve 6, a first valve 7, a second valve 8, a third valve 9, a fourth valve 10, a fifth valve 11, the sand-filled pipe model 12 for displacement, a heating oven 18 configured to simulate the reservoir environmental temperature, the ultraviolet spectrophotometer 17 configured to determine the absorbance of the polymer solution, a buffer bottle 13, a drying pipe 14, a vacuum pump 15, and a sample receiving tube 16.

In this example, in step (2), the quartz sand mesh in the sand-filling model was 60-80 mesh, the dry weight was 100.5 g, and the liquid measurement permeability of the sand-filling model was 0.5 D. The displacement device was vacuumized for 6 h to saturate formation water for 6 h. 2.1 PV untriggered polymer capsule solution was first injected according to an injection speed of 0.5 mL/min, and a particle size range of the polymer capsule was 0.5-1.5 µm. Then, simulated formation water flooding was carried out, and after the water flooding reached 6 PV, no polymer capsule solution flowed out from the effluent at an outlet end, then the experiment was stopped.

The polymer capsule displacement experiment was performed to determine the release concentration of polymers in the effluent.

When determining the release concentration of polymers in the effluent, the polymer capsule displacement experimental device was first vacuumized to saturate formation water, and then a polymer capsule solution with a certain volume multiple of a known concentration was injected. Later, simulated formation water flooding was carried out until no polymer capsule solution flowed out from the effluent at the outlet end. The effluent was diluted, capsule particles in the diluted solution were filtered and removed, and the absorbance value of the solution was determined to obtain the release concentration of polymers in the effluent based on the standard curve between the polymer solution concentration and the absorbance in step (1). During the experiment, the fluid injection rate could be 0.01-1 mL/min, the time interval of the effluent sample receiving could be 5-20 min/time, and the dilution multiple of the effluent could be in the range of 20-50 times.

In step (3), an expression of the total adsorption retention of polymers in the porous medium is shown in equation (IV):

$$A_r = \frac{C_{c\text{-}polymer} V_0 - \sum_{i=1}^{n}(C_{polymer,i,t} V_i)}{W}, \quad \text{(IV)}$$

where $A_r$ is the total adsorption retention of polymers in the porous medium, $V_0$ is the injection volume of polymer capsules, $V_i$ is the volume of an i-th effluent sample, $C_{polymer,i,t}$ is the concentration of completely triggered polymers in the i-th effluent sample acquired at an aging t moment, n is the total number of effluent samples, and W is the total dry weight of quartz sand.

In step (4), an expression of the adsorption retention of polymer molecules in the porous medium is shown in equation (V):

$$A_{r,p} = \frac{C_{polymer,t} V_0 - \sum_{i=1}^{n} C_{p,i,t} V_i}{W}, \quad \text{(V)}$$

where $A_{r,p}$ is the adsorption retention of polymer molecules in the porous medium, and $C_{p,i,t}$ is the concentration of polymer molecules in an i-th effluent sample acquired at the aging t moment.

An expression of the adsorption retention of capsule particles in the porous medium is shown in equation (VI):

$$A_{r,c} = \frac{c\left[C_{p\text{-}capsule,t} V_0 - \sum_{i=1}^{n}(C_{polymer,i,t} - C_{p,i,t})V_i\right]}{W},$$ (VI)

where $A_{r,c}$ is the adsorption retention of capsule particles in the porous medium.

Figure 4:
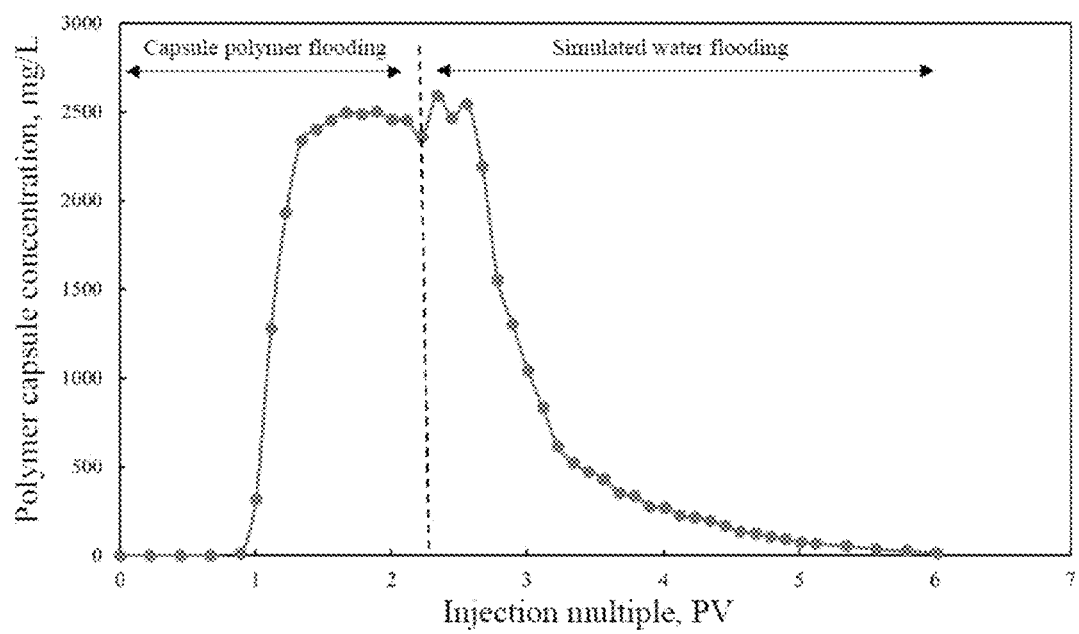
FIG. 4 is a schematic diagram of a dynamic adsorption curve of polymer capsules in a sand-filling model in an untriggered state.

In this example, the effluent was diluted, and every 2 mL of effluent was taken as a sample receiving unit. Each sample was diluted 40 times. Then, the effluent was vacuumized, deoxidized, and sealed in a 10 mL ampoule bottle and placed in a 75° C. environment for complete triggering to release the encapsulated polymers. Later, the total polymer concentration of the effluent was determined to obtain the total adsorption retention of polymers in the porous medium. FIG. 4 shows a dynamic adsorption curve of polymer capsules in a sand-filling model in an untriggered state. Based on the adsorption curve, it can be obtained that the dynamic adsorption retention of polymer capsule particles was 0.01597 mg/g in the untriggered state, and the adsorption retention of polymers was 0.01278 mg/g.

While embodiments of the present disclosure have been shown and described, it will be understood by a person skilled in the art that various changes, modifications, substitutions, and alterations may be made on these embodiments without departing from the principles and spirit of the present disclosure, and the scope of the present disclosure is defined by the appended claims and their equivalents.

What is claimed is:

1. A method for determining dynamic adsorption retention of polymer capsules, comprising:
   (1) carrying out a thermal aging experiment to establish relational expressions between a capsule concentration and an aging time, as well as a polymer release concentration and the aging time;
   measuring an absorbance of different concentrations of polymer solutions, and drawing a standard curve between a polymer solution concentration and the absorbance; preparing a series of polymer capsule concentrations, and triggering and releasing encapsulated polymers to establish a relational expression between the capsule concentration and a complete release concentration of polymers; and establishing a relational expression between the polymer release concentration and the aging time, as well as a relational expression between a concentration of unreleased polymers encapsulated by capsules and the aging time through the thermal aging experiment;
   (2) setting up a polymer capsule displacement experimental device to determine a release concentration of polymers in effluent;
   carrying out a polymer capsule displacement experiment, periodically acquiring an effluent, then diluting the effluent, filtering and removing capsule particles in a diluted solution, and determining an absorbance value of the diluted solution to obtain the release concentration of polymers in an effluent based on the standard curve between the polymer solution concentration and the absorbance in step (1);
   (3) releasing polymers encapsulated by capsules in the effluent to acquire a total adsorption retention of polymers in a porous medium;
   performing a thermal aging experiment after diluting the effluent, comprising: sealing and placing the effluent at a reservoir temperature for complete triggering to release encapsulated polymers; and determining a total polymer concentration of the effluent; and
   (4) inverting respective adsorption retentions of the capsule particles and the polymers in the porous medium;
   calculating a concentration of polymers encapsulated by remaining capsule particles in the diluted solution based on the release concentration of polymers in the effluent before an effluent triggering in step (2) and the total polymer concentration of the effluent after the effluent triggering in step (3); and
   inverting respective adsorption retentions of the capsule particles and polymer molecules in the porous medium according to the relational expressions between the polymer release concentration and the aging time, as well as the concentration of unreleased polymers encapsulated by capsules and the aging time, and the standard curve between the polymer solution concentration and the absorbance obtained in step (1).

2. The method according to claim 1, wherein in step (1), an expression of the standard curve between the polymer solution concentration and the absorbance is shown in equation (I):

$$C_{polymer} = a \times A + b$$ (I)

wherein $C_{polymer}$ is an unencapsulated polymer solution concentration, A is the absorbance, and a and b are fitting constants.

3. The method according to claim 1, wherein in step (1), the relational expression between the capsule concentration and the complete release concentration of polymers is shown in equation (II)

$$C_{capsule} = c \times C_{c\text{-}polymer}$$ (II)

wherein $C_{capsule}$ is the capsule concentration, $C_{c\text{-}polymer}$ is the complete release concentration of polymers in capsules, and c is a fitting constant.

4. The method according to claim 1, wherein in step (1), at an aging t moment, the relational expressions between the polymer release concentration and the aging time, as well as the concentration of unreleased polymers encapsulated by capsules and the aging time are shown in equation (III):

$$C_{c\text{-}polymer} = C_{polymer,t} + C_{p\text{-}capsule,t}$$ (III)

wherein $C_{c\text{-}polymer}$ is the complete release concentration of polymers in capsules, $C_{polymer,t}$ is the polymer release concentration in the solution at the aging t moment, and $C_{p\text{-}capsule,t}$ is the concentration of unreleased polymers encapsulated by capsules at the aging t moment.

5. The method according to claim 1, wherein in step (2), the polymer capsule displacement experimental device is set up to perform the polymer capsule displacement experiment;
the polymer capsule displacement experimental device comprises intermediate containers configured to contain different release levels of polymer capsule solutions and simulated formation water, a sand-filled pipe model for displacement, a heating device configured to simulate the reservoir environmental temperature, and an ultraviolet spectrophotometer configured to determine the absorbance of the polymer solution.

6. The method according to claim 5, wherein the polymer capsule displacement experimental device comprises an injection pump, an injection pipeline, a first intermediate container configured to contain the different release levels of polymer capsule solutions, a second intermediate container configured to contain the simulated formation water, a first six-way valve, a second six-way valve, a first valve, a second valve, a third valve, a fourth valve, a fifth valve, the sand-filled pipe model for displacement, a heating oven configured to simulate the reservoir environmental temperature, the ultraviolet spectrophotometer configured to determine the absorbance of the polymer solution, a buffer bottle, a drying pipe, a vacuum pump, and a sample receiving tube.

7. The method according to claim 1, wherein in step (3), an expression of the total adsorption retention of polymers in the porous medium is shown in equation (IV):

$$A_r = \frac{C_{c\text{-}polymer}V_0 - \sum_{i=1}^{n}(C_{polymer,i,t}V_i)}{W}, \quad (IV)$$

wherein $A_r$ is the total adsorption retention of polymers in the porous medium, $C_{c\text{-}polymer}$ is the complete release concentration of polymers in capsules, $V_0$ is the injection volume of polymer capsules, $V_i$ is the volume of an i-th effluent sample, $C_{polymer,i,t}$ is the concentration of completely triggered polymers in the i-th effluent sample acquired at an aging t moment, n is the total number of effluent samples, and W is the total dry weight of quartz sand.

8. The method according to claim 1, wherein in step (4), an expression of the adsorption retention of polymer molecules in the porous medium is shown in equation (V):

$$A_{r,p} = \frac{C_{polymer,t}V_0 - \sum_{i=1}^{n}C_{p,i,t}V_i}{W}, \quad (V)$$

wherein $A_{r,p}$ is the adsorption retention of polymer molecules in the porous medium, $C_{polymer,t}$ is the polymer release concentration in the solution at an aging t moment, $C_{p,i,t}$ is the concentration of polymer molecules in an i-th effluent sample acquired at the aging t moment, $V_0$ is the injection volume of polymer capsules, $V_i$ is the volume of the i-th effluent sample, n is the total number of effluent samples, and W is the total dry weight of quartz sand.

9. The method according to claim 1, wherein an expression of the adsorption retention of capsule particles in the porous medium is shown in equation (VI):

$$A_{r,c} = \frac{c\left[C_{p\text{-}capsule,t}V_0 - \sum_{i=1}^{n}(C_{polymer,i,t} - C_{p,i,t})V_i\right]}{W} \quad (VI)$$

wherein $A_{r,c}$ is the adsorption retention of capsule particles in the porous medium, c is the fitting constant, $C_{p\text{-}capsule,t}$ is the concentration of unreleased polymers encapsulated by capsules at the aging t moment, $V_0$ is the injection volume of polymer capsules, n is the total number of effluent samples, $C_{polymer,i,t}$ is the concentration of completely triggered polymers in the i-th effluent sample acquired at the aging t moment, $C_{p,i,t}$ is the concentration of polymer molecules in the i-th effluent sample acquired at the aging t moment, $V_i$ is the volume of the i-th effluent sample, and W is the total dry weight of quartz sand.

\* \* \* \* \*